(12) United States Patent
Polka (10) Patent No.: US 9,511,624 B2
(45) Date of Patent: *Dec. 6, 2016

(54) WHEEL COVER ASSEMBLY AND METHOD OF MOUNTING

(71) Applicant: RealWheels Corporation, Gurnee, IL (US)

(72) Inventor: John Polka, Gurnee, IL (US)

(73) Assignee: RealWheels Corporation, Gurnee, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,149

(22) Filed: Jan. 25, 2016

(65) Prior Publication Data

US 2016/0193870 A1    Jul. 7, 2016

Related U.S. Application Data

(62) Division of application No. 13/842,482, filed on Mar. 15, 2013, now Pat. No. 9,365,074.

(51) Int. Cl.
| | |
|---|---|
| *B60B 7/14* | (2006.01) |
| *B60B 7/06* | (2006.01) |
| *B60B 7/04* | (2006.01) |
| *B60C 29/06* | (2006.01) |
| *B60B 7/00* | (2006.01) |

(52) U.S. Cl.
CPC ............... *B60B 7/068* (2013.01); *B60B 7/04* (2013.01); *B60B 7/066* (2013.01); *B60B 7/14* (2013.01); *B60C 29/06* (2013.01); *B60B 7/0073* (2013.01); *B60B 2900/1216* (2013.01); *Y10T 29/49542* (2015.01)

(58) Field of Classification Search
CPC .......... B60B 7/00; B60B 7/0066; B60B 7/008; B60B 7/06
See application file for complete search history.

(56) References Cited

U.S. PATENT DOCUMENTS

| | | | | |
|---|---|---|---|---|
| 1,722,783 A | * | 7/1929 | Basseches | ............... B60C 29/00 152/427 |
| 1,871,144 A | * | 8/1932 | Wilczynski | ............. B60B 11/06 152/427 |
| 2,432,531 A | * | 12/1947 | Lyon | ......................... B60B 7/04 301/37.376 |
| 2,440,805 A | * | 5/1948 | Lyon | .................... B62D 43/005 206/304.1 |
| 2,526,026 A | | 10/1950 | Horn | |

(Continued)

FOREIGN PATENT DOCUMENTS

| | | |
|---|---|---|
| EP | 0200812 B1 | 9/1985 |
| EP | 0300538 B1 | 7/1988 |

OTHER PUBLICATIONS

Aerotech CAPS flyer. AeroTechCaps.com, Jenison, MI. Date: Unknown.

*Primary Examiner* — Brodie Follman
(74) *Attorney, Agent, or Firm* — Jansson Munger McKinley & Kirby Ltd.

(57) ABSTRACT

The present invention relates to attaching aerodynamic wheel covers to the wheel of a truck or other heavy duty vehicle, and to a method of installation that does not require the removal of the nuts retaining the wheel to the hub of the axle and allows the air pressure of tires on such wheels to be easily adjusted.

7 Claims, 8 Drawing Sheets

(56) References Cited

U.S. PATENT DOCUMENTS

| | | | | |
|---|---|---|---|---|
| 2,639,948 A * | 5/1953 | Grimshaw | B60B 7/01 | |
| | | | 188/264 W | |
| 2,650,135 A * | 8/1953 | Lyon | B60B 7/04 | |
| | | | 301/37.105 | |
| 2,794,684 A | 6/1957 | Lyon | | |
| 3,356,421 A * | 12/1967 | Trevarrow, Jr. | B60B 7/02 | |
| | | | 301/37.372 | |
| 3,515,196 A * | 6/1970 | Floria | B60B 7/00 | |
| | | | 152/454 | |
| 3,532,385 A | 10/1970 | Foster et al. | | |
| 3,724,905 A | 4/1973 | Kachler | | |
| 3,860,297 A * | 1/1975 | Solis | B60B 11/02 | |
| | | | 301/111.07 | |
| 3,939,894 A * | 2/1976 | Curtis | B60C 29/06 | |
| | | | 152/427 | |
| 3,988,039 A | 10/1976 | Spisak | | |
| 4,064,923 A * | 12/1977 | German | B60C 29/02 | |
| | | | 152/415 | |
| 4,261,621 A * | 4/1981 | Fox | B60B 11/02 | |
| | | | 301/35.628 | |
| 4,333,688 A * | 6/1982 | Lemmon | B60B 11/02 | |
| | | | 301/36.1 | |
| 4,593,953 A | 6/1986 | Baba et al. | | |
| 4,725,100 A | 2/1988 | Patti | | |
| 4,761,040 A * | 8/1988 | Johnson | B60B 7/14 | |
| | | | 301/108.4 | |
| 4,842,339 A | 6/1989 | Roulinson | | |
| 4,889,394 A | 12/1989 | Ruspa | | |
| 4,895,415 A | 1/1990 | Stay et al. | | |
| 4,971,396 A * | 11/1990 | Morris | B60B 7/14 | |
| | | | 301/108.4 | |
| 4,974,909 A | 12/1990 | Patti et al. | | |
| 5,042,881 A | 8/1991 | Polka | | |
| 5,061,014 A | 10/1991 | Polka | | |
| 5,167,440 A | 12/1992 | FitzGerald | | |
| 5,222,785 A | 6/1993 | Green | | |
| 5,263,770 A * | 11/1993 | Goudey | B60B 7/04 | |
| | | | 301/108.4 | |
| 5,294,189 A | 3/1994 | Price et al. | | |
| 5,358,313 A * | 10/1994 | Polka | B60B 7/04 | |
| | | | 301/108.4 | |
| 5,366,278 A | 11/1994 | Brumfield | | |
| 5,366,279 A | 11/1994 | Polka | | |
| 5,443,582 A * | 8/1995 | Ching | B60B 7/14 | |
| | | | 301/37.26 | |
| RE35,497 E * | 4/1997 | Carter, III | B60B 7/10 | |
| | | | 301/37.31 | |
| 5,630,653 A | 5/1997 | Polka | | |
| 5,770,797 A * | 6/1998 | Lapohn | B60C 23/02 | |
| | | | 116/34 R | |
| 5,795,035 A | 8/1998 | Fuller | | |
| 5,823,635 A * | 10/1998 | Polka | B60B 7/008 | |
| | | | 301/37.109 | |
| 6,045,195 A * | 4/2000 | Okamoto | B60B 7/20 | |
| | | | 301/37.108 | |
| 6,105,645 A * | 8/2000 | Ingram | B60C 23/003 | |
| | | | 152/415 | |
| 6,120,104 A * | 9/2000 | Okamoto | B60B 7/20 | |
| | | | 301/37.25 | |
| 6,152,537 A * | 11/2000 | Wright | B60B 7/10 | |
| | | | 301/37.31 | |
| 6,189,977 B1 * | 2/2001 | Kennedy | B60B 3/16 | |
| | | | 152/379.5 | |
| 6,325,124 B1 * | 12/2001 | Colussi | B60C 23/003 | |
| | | | 152/415 | |
| 6,378,954 B1 | 4/2002 | Polka | | |
| 6,378,955 B1 * | 4/2002 | Adamson | B60B 3/16 | |
| | | | 301/108.4 | |
| 6,386,642 B2 | 5/2002 | Maloney et al. | | |
| 6,409,277 B2 | 6/2002 | Nunes et al. | | |
| 6,443,528 B1 | 9/2002 | Polka | | |
| 6,467,852 B1 | 10/2002 | Polka | | |
| 6,595,596 B1 * | 7/2003 | Polka | B60B 7/02 | |
| | | | 301/37.102 | |
| 6,682,151 B1 | 1/2004 | Van Houten et al. | | |
| 6,705,369 B1 * | 3/2004 | Russell | B60C 29/02 | |
| | | | 152/427 | |
| 6,820,475 B2 | 11/2004 | Wallach | | |
| 6,983,998 B2 | 1/2006 | Litzka | | |
| 7,059,684 B1 * | 6/2006 | Polka | B60B 7/04 | |
| | | | 301/37.371 | |
| 7,218,210 B2 | 5/2007 | Schoenberger et al. | | |
| 7,344,198 B1 * | 3/2008 | Dohm | B60B 7/20 | |
| | | | 301/37.25 | |
| 7,677,677 B1 | 3/2010 | Roberts | | |
| 2003/0038529 A1 * | 2/2003 | Hsu | B60B 3/16 | |
| | | | 301/37.371 | |
| 2005/0199328 A1 * | 9/2005 | Schoenberger | B60C 23/0408 | |
| | | | 152/415 | |
| 2009/0224597 A1 | 9/2009 | Wood | | |
| 2012/0043803 A1 * | 2/2012 | Grill | B60B 7/0013 | |
| | | | 301/37.26 | |
| 2012/0181849 A1 * | 7/2012 | Rogers | B60B 7/00 | |
| | | | 301/37.24 | |
| 2013/0015698 A1 * | 1/2013 | Butler | B60B 7/0013 | |
| | | | 301/37.29 | |
| 2013/0076107 A1 * | 3/2013 | Starnes | B60B 7/00 | |
| | | | 301/37.102 | |
| 2013/0207447 A1 * | 8/2013 | De Lima | B60B 3/145 | |
| | | | 301/9.1 | |
| 2014/0265533 A1 * | 9/2014 | Polka | B60B 7/14 | |
| | | | 301/37.102 | |
| 2014/0284994 A1 * | 9/2014 | Polka | B60B 7/04 | |
| | | | 301/37.102 | |

* cited by examiner

WHEEL COVER ASSEMBLY AND METHOD OF MOUNTING

CROSS-REFERENCE TO RELATED APPLICATION

The present application claims priority to pending U.S. patent application Ser. No. 13/842,482, filed Mar. 15, 2013, the contents of which are incorporated by reference in its entirety.

BACKGROUND

It has become common for the owners of trucks, tractors, trailers, recreational vehicles and other heavy duty vehicles to desire to increase the gas mileage of such vehicles, particularly as gas prices rise, by adding aerodynamic enhancements. Such aerodynamic enhancements include adding wheel covers to such vehicles. Nuts and bolts typically extend out from the rims of the wheels on such vehicles, the rims may protrude or the wheels may be extremely concave increasing the drag and reducing the optimal performance of the vehicle. Owners of such vehicles also desire to customize them by providing decorative wheel covers to enhance the otherwise unattractive wheels thereof. Thus, there is a need for an aerodynamic wheel cover that is durable, enhances the performance and gas mileage of the vehicle by reducing drag and improving the overall appearance of the vehicle and its wheels. There is need for a wheel cover assembly and installation method that is easy to install and can be quickly assembled for use on a heavy duty vehicle.

The mounting assembly and associated wheel cover mounting method disclosed herein improve the wheel cover installation and removal process since the method requires a reduced number of tools and can be accomplished faster and simpler, with fewer parts than existing wheel cover mounting methods and mechanisms.

A significant source of drag on tractor-trailers includes the wheel assemblies of the vehicle. Such lead to increased transportation costs which are ultimately passed on to the consumers in the price of delivered products. In general, the aerodynamic drag of a vehicle increases when air flow is affected by a wheel opening. Such is particularly significant with deep wheel openings commonly found on heavy duty vehicles.

Consequently, there is a need for wheel covers that decrease drag. Accordingly, embodiments described herein provide mounting assemblies, mechanisms and methods for attaching cover assemblies, particularly aerodynamic wheel cover assemblies, to wheel assemblies which do not require the removal of the nuts retaining the wheel to the hub of the axle. In addition, there is a need for such a wheel cover assembly which allows the air pressure of tires on such wheels to be easily checked and adjusted when installed on the vehicle wheel.

SUMMARY

In a preferred embodiment, a wheel cover assembly for covering a wheel of a vehicle is provided which includes the vehicle having a hub surrounded by a plurality of parallel spaced studs. Each of the studs has a longitudinal axis with a fixed distance between adjacent ones of the longitudinal axes. The wheel having a web with a plurality of holes therein for receiving the studs and a nut threaded on each of the studs to retain the hub to the axle of the vehicle. The cover assembly includes a first retainer member having a first planar portion for contacting one of the parallel spaced studs, the first planar portion having a surface perpendicular to the longitudinal axis of the stud while in contact with the parallel spaced studs. The wheel cover also includes a second retainer member having a second planar portion for contacting one of the parallel spaced studs, the second planar portion having a surface perpendicular to the longitudinal axis of the stud while in contact with the parallel spaced studs and a connecting member spanning the first and second retainer members. An adjustment member for adjusting the relative position of the connecting member with respect to the first and second retainer members is also included.

In another preferred embodiment the cover assembly may also include a locking member for locking and unlocking the connecting member from the first and second retainer members. The locking member may be a threaded fastener and a nut. In a further preferred embodiment, the cover assembly may also include a first mounting arm extending from the connecting member and a second mounting arm extending from the connecting member. In yet another preferred embodiment the cover may include two or more mounting arms extending from connecting member, depending on the number of mounting positions necessary.

In another preferred embodiment a first air valve extension positioned on the connecting member may also be included which may be attached to the first mounting arm. A second air valve extension may be included and positioned on the connecting member or attached to a second mounting arm. The first and second air valve extensions may be mounted to their respective mounting arms through respective threaded connections.

In a further preferred embodiment, an aerodynamic wheel cover may be attached to the connecting member for covering the opening of the wheel and allowing access to the first or second air valve extension.

In another preferred embodiment, a method of mounting an aerodynamic cover to a wheel of a vehicle is also provided. The vehicle includes a hub surrounded by a plurality of parallel spaced studs, each of the studs having a longitudinal axis with a fixed distance between adjacent ones of the longitudinal axes. The wheel includes an opening with a web having a plurality of holes therein for receiving the studs and a nut threaded on each of the studs to retain the hub to the axle of the vehicle. The method of mounting the cover to the wheel includes placing a first retainer member having a first planar portion on two of the parallel spaced studs. The first planar portion has a surface perpendicular to the longitudinal axis of the stud while in contact with the parallel spaced studs. A second retainer member having a second planar portion is placed on two of the parallel spaced studs, the second planar portion having a surface perpendicular to the longitudinal axis of the stud while in contact with the parallel spaced studs. A connecting member is positioned across the first and second retainer members and an adjustment member for adjusting the relative position of the connecting member is placed with respect to the first and second retainer members. A first mounting arm extends from the connecting member and is mounted to the first mounting arm. A first air valve extension is positioned on the first mounting arm, and the aerodynamic wheel cover is fastened to the connecting member for covering the opening of the wheel and providing access to the first air valve extension. The connecting member may be rigidly locked and unlocked to and from the first and second retainer members.

In another preferred embodiment a second mounting arm may be mounted to the connecting member and extends therefrom and, a second air valve extension may be positioned on the second mounting arm.

BRIEF DESCRIPTION OF THE DRAWINGS

In order that the advantages of the invention will be readily understood, a more detailed description of the invention briefly described above will be rendered by reference to specific preferred embodiments that are illustrated in the appended drawings. Understanding that these drawings depict only typical preferred embodiments of the invention and are not therefore to be considered to be limiting of its scope, the invention will be described and explained with additional specificity and detail through the use of the accompanying drawings, in which:

FIG. 6 is a further isometric view of the preferred embodiment of the attachment device shown in FIGS. 4 and 5 with an aerodynamic wheel cover installed thereon and air valves accessible there through;

DETAILED DESCRIPTION

A significant source of drag on tractor-trailers includes the wheel assemblies of the vehicle. Such lead to increased transportation costs which are ultimately passed on to the consumers in the price of delivered products. In general, the aerodynamic drag of a vehicle increases when air flow is affected by a wheel opening. Such is particularly significant with deep wheel openings commonly found on heavy duty vehicles.

Consequently, there is a need for wheel covers that decrease drag. Accordingly, embodiments described herein provide mounting assemblies, mechanisms and methods for attaching cover assemblies, particularly aerodynamic wheel cover assemblies, to wheel assemblies which do not require the removal of the lug nuts retaining the wheel to the hub of the axle. In addition, there is a need for such a wheel cover assembly which allows the air pressure of tires on such wheels to be easily checked and adjusted when installed on the vehicle wheel.

Exemplary embodiments will now be described with reference to the accompanying drawings, in which exemplary embodiments are shown. This disclosure may, however, be embodied in many different forms and should not be construed as limited to the exemplary embodiments or materials set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments. The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated or vary in scale for clarity.

Reference throughout this specification to "exemplary embodiment," "one embodiment," "an embodiment," "preferred embodiment," or similar language means that a particular feature, structure, or characteristic described in connection with the embodiment is included in at least one embodiment of the present invention. Thus, appearances of the phrases "in an exemplary embodiment," "in one embodiment," "in an embodiment," "in a preferred embodiment," and similar language throughout this specification may, but do not necessarily, all refer to the same embodiment.

As used herein, the term "wheel assembly" and "wheel assemblies" may refer to a single wheel or a dual wheel assembly, particularly as it relates to heavy duty vehicles including but not limited to tractor-trailer vehicles. An aerodynamic wheel cover that is durable, enhances the performance and gas mileage of the vehicle by reducing drag and which improves the overall appearance of the vehicle and its wheels is provided. The described preferred embodiments provide a wheel cover assembly and installation method which are easy to install and carry out, and can be quickly assembled for use on a heavy duty vehicle.

The preferred embodiments of the illustrated mounting assemblies and associated wheel cover mounting methods improve the wheel cover installation and removal process since the methods require a reduced number of tools and can be accomplished faster and simpler, with fewer parts than existing wheel cover mounting methods and mechanisms.

Figure 1:
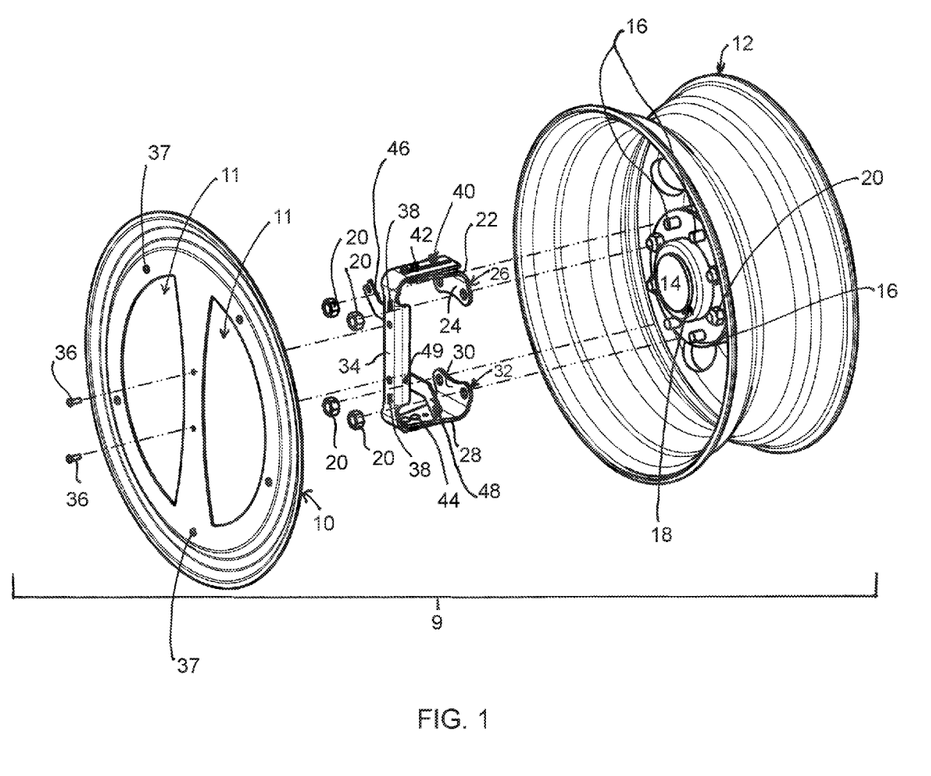
FIG. 1 is an exploded, isometric view of a preferred embodiment of the wheel cover assembly having an attachment device for attaching the wheel cover to a wheel in accordance with the present invention.
Figure 2:
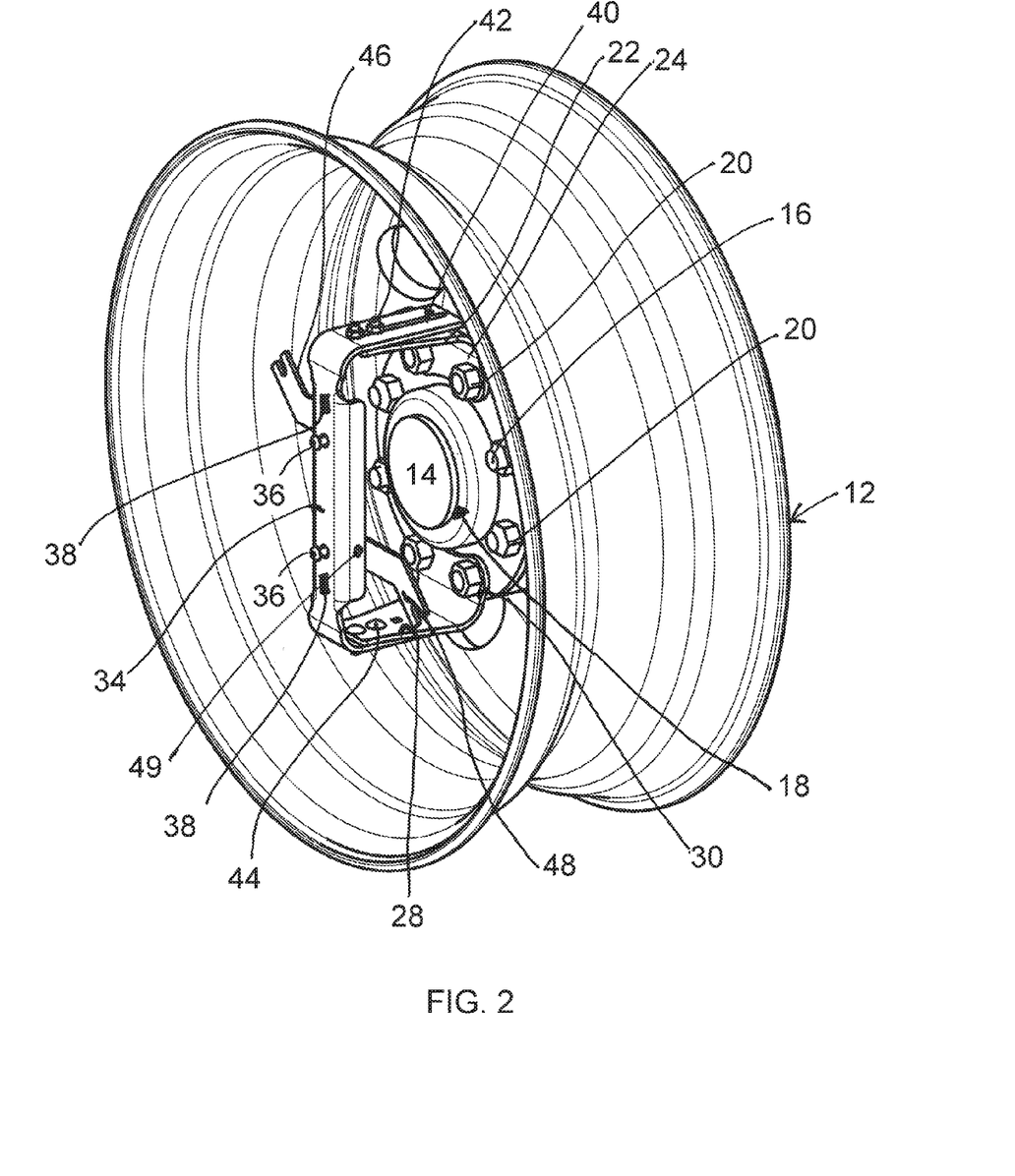
FIG. 2 is an isometric view of the preferred embodiment of the attachment device shown in FIG. 1 shown installed on the hub of a wheel.
Figure 3:
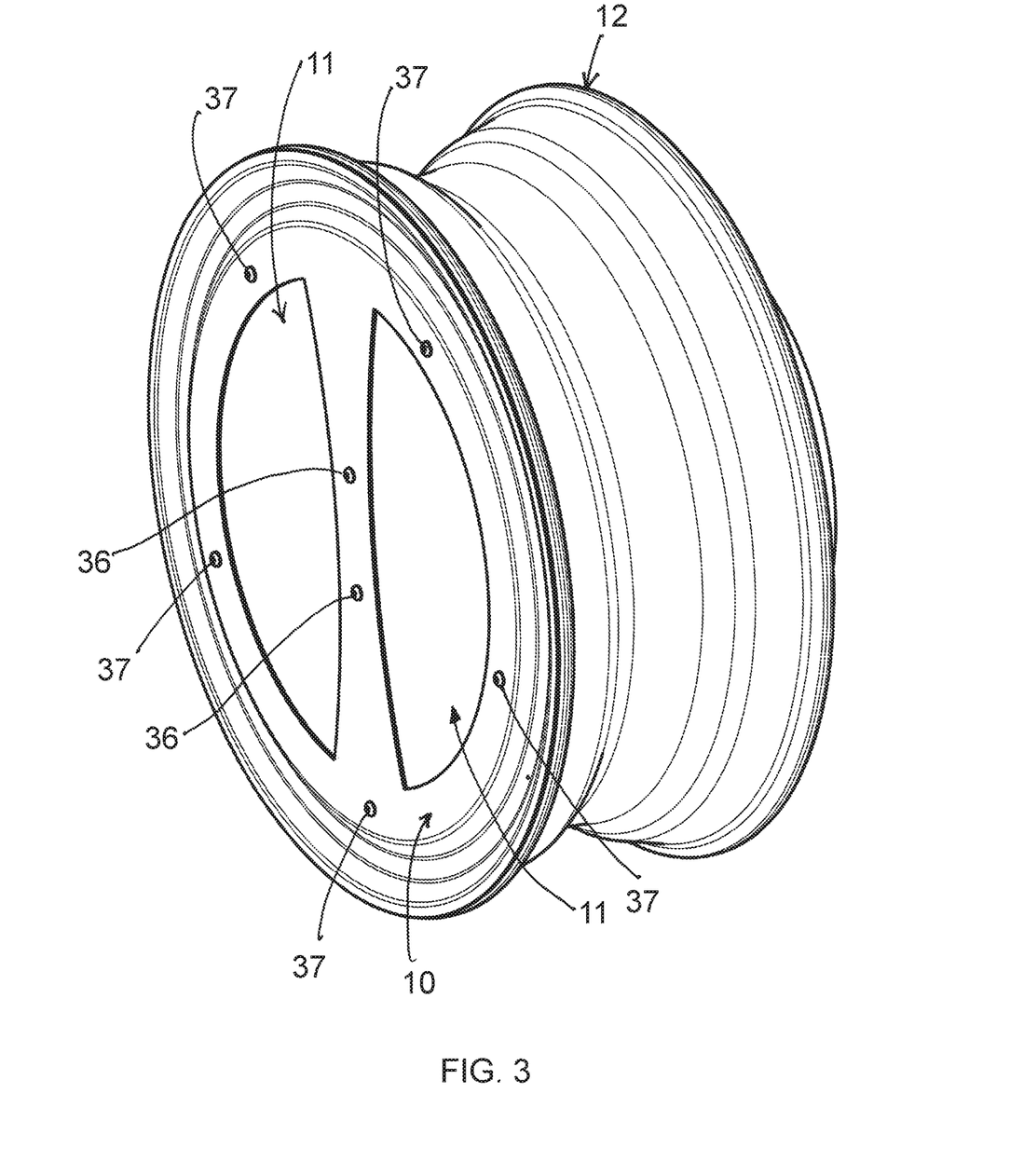
FIG. 3 is a further isometric view of the preferred embodiment of the attachment device shown in FIGS. 1 and 2 with an aerodynamic wheel cover installed thereon.

A first preferred embodiment of the wheel cover assembly 9 of the present invention is shown in FIGS. 1-3 and includes a cover 10 for covering the outer surface of a wheel assembly including wheel 12. Cover 10 may be made of a solid member constructed out of aluminum, plastic or other durable material. In the alternative, cover 10 may be constructed of clear material such as clear plastic, Lexan® or similar durable clear material. In addition, cover 10 may include cut outs such as openings 11 with a round insert of clear plastic, Lexan® or similar durable clear material creating windows in conjunction with openings 11 in cover 10. Such material may be full sheet or fitted inserts as required by the particular installation.

Wheel 12 is mounted on a hub, the central portion 14 of which extends through a central opening in the wheel 12. The hub has a plurality of parallel extending equally spaced threaded studs 16 surrounding the central portion 14 thereof. Wheel 12 has a central opening 18 through which the central portion 14 of the hub extends and a plurality of spaced holes (not shown) for receiving studs 16. Threaded on the distal end of each of the studs 16 is a nut 20 for securing the hub to the axle of the vehicle.

Wheel cover assembly 9 includes a first retainer member 22 having a planar portion 24, both of which are preferably made of shaped sheet metal, for contacting one of the parallel spaced studs 16. It may be appreciated by those skilled in the art that all elements of the wheel cover mounting assembly described herein may be made of a variety of materials including metal, plastic, carbon fiber, aluminum or other hardened material and such components are not being limited in their construction by preferred recitations herein (as described more generally above). Planar portion 24 has a surface 26 which is perpendicular to the longitudinal axis of stud 16 when retainer member 22 is mounted on stud 16 and planar portion 24 is in contact with stud 16. Wheel cover assembly 9 includes a second retainer member 28 having a planar portion 30, both of which are preferably made of shaped sheet metal, for contacting one of the parallel spaced studs 16. Planar portion 30 has a surface 32 which is perpendicular to the longitudinal axis of the stud when second retainer member 28 is mounted on stud 16 and planar portion 30 is in contact with parallel spaced stud 16. It may be appreciated by one skilled in the art, that while the preferred embodiment shows the removal of nuts 20, retainer members 22, 28 and associate planar portions 26, 32 may be mounted on available excess stud portions of the axle without removal of nuts 20. A connecting member 34 is connected to first retainer member 22 and second retainer member 28. Connecting member 34 as illustrated is a plate formed out of sheet metal and spans first and second retainer members 22, 28. Connecting member 34 provides a surface to which cover 10 is mounted with fasteners 36. In one preferred embodiment of cover 10, additional fasteners, such as bolts 37, are provided to attach a clear round insert of clear plastic, Lexan® or similar durable clear material behind cover 10 providing a covering creating a window behind openings 11.

A spacer element, such as spacers 38, may positioned between the connecting member and the cover for spacing the cover from the wheel during installation. Spacers 38 may be made of foam, plastic, rubber, metal or the like or a combination of such materials which preferably exhibit a resiliency to properly position the wheel cover with respect to the rim of wheel 12.

An adjustment member including slots 40 in combination with fasteners 42 and nuts 44 are provided for adjusting the relative position of connecting member 34 with respect to the first and second retainer members 22, 28. A locking member such as the combination of nuts and threaded bolts can be provided for locking and unlocking connecting member 34 from first and second retainer members 22, 28.

As shown in FIGS. 1, 2, 4, 5 and 7, connecting member 34 includes a first mounting arm 46 and a second mounting arm 48 extending from the connecting member. Mounting arms 46, 48 may be attached to connecting member 34 with appropriate fasteners 49. Mounts arms 48, 48 may be adjustable through the use of appropriate fasteners with respect to connecting member 34. Further the connecting member 34 may include two or more mounting arms 46, 48 simultaneously extending from connecting member 34, depending on the number of mounting locations necessary.

Figure 4:
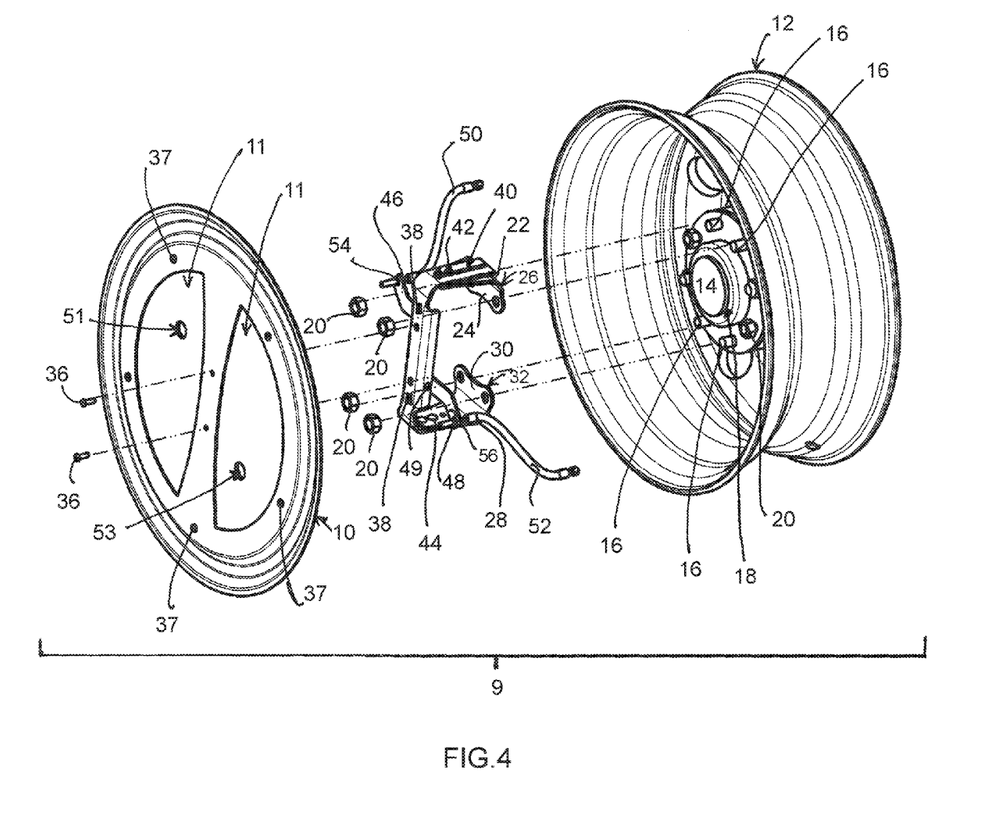
FIG. 4 is an exploded, isometric view of another preferred embodiment of the wheel cover assembly having an attachment device with air valve extensions for attaching the wheel cover to a wheel in accordance with the present invention.
Figure 5:
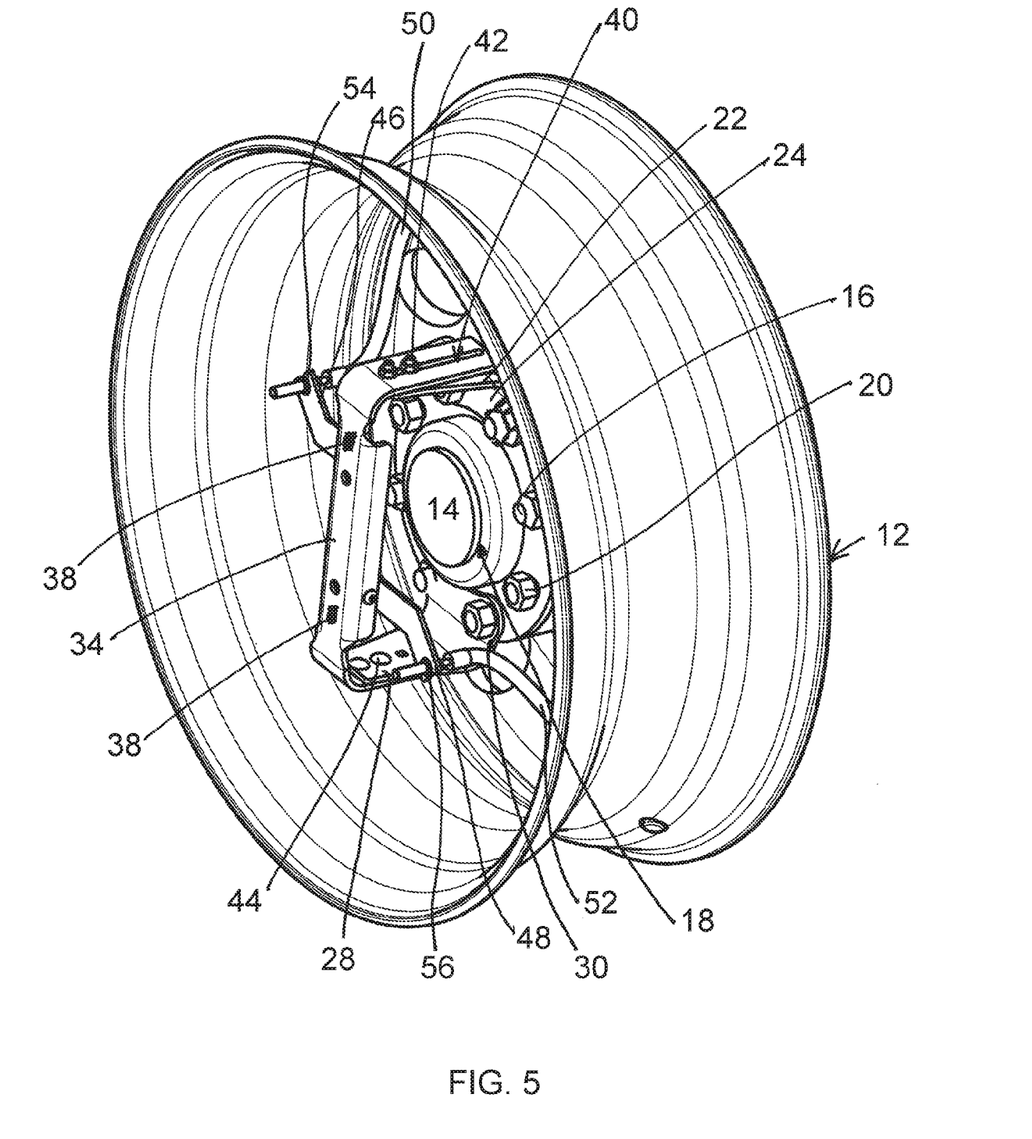
FIG. 5 is an isometric view of the preferred embodiment of the attachment device shown in FIG. 4 shown installed on the hub of a wheel.
Figure 6:
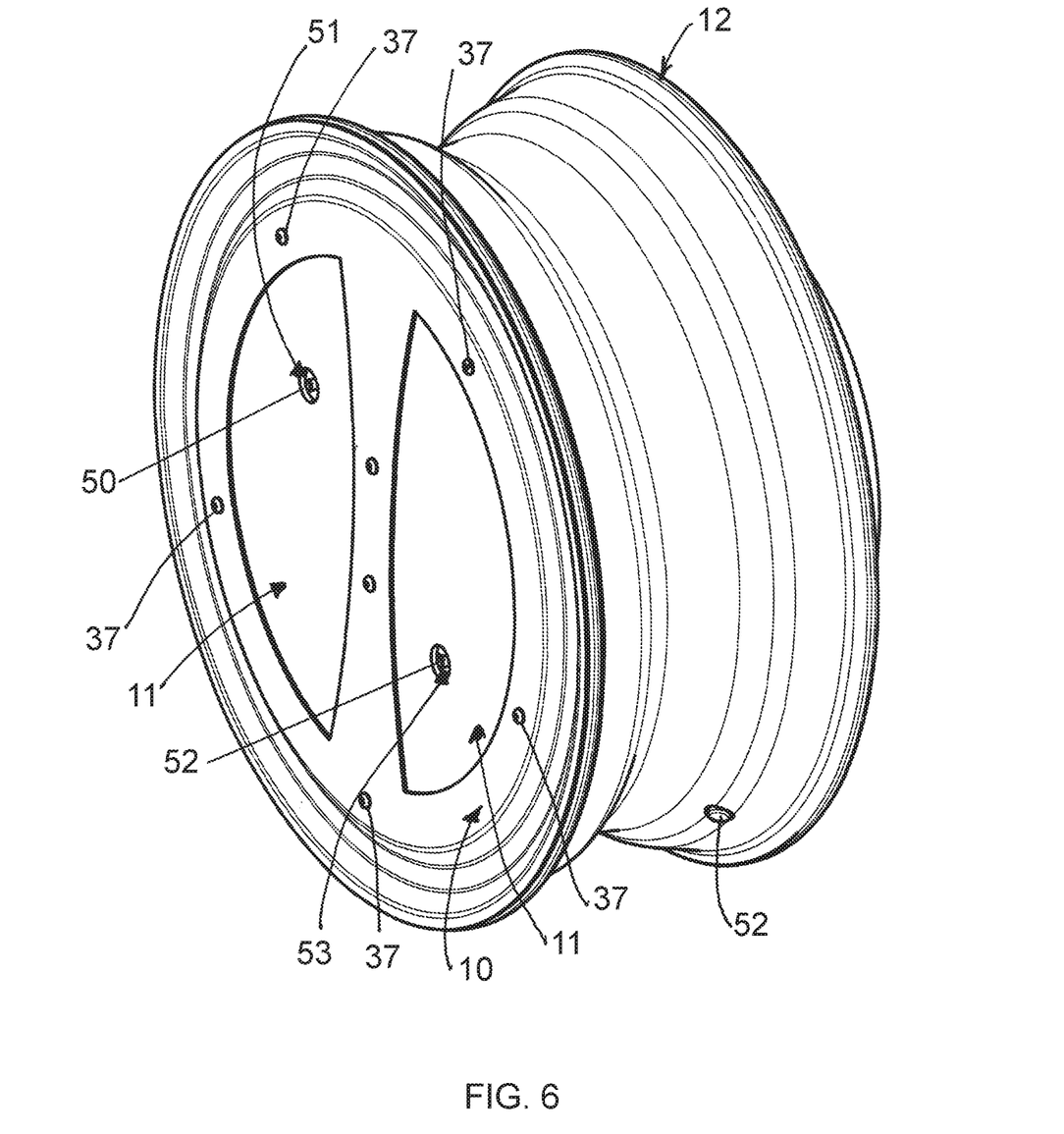
Figure 7:
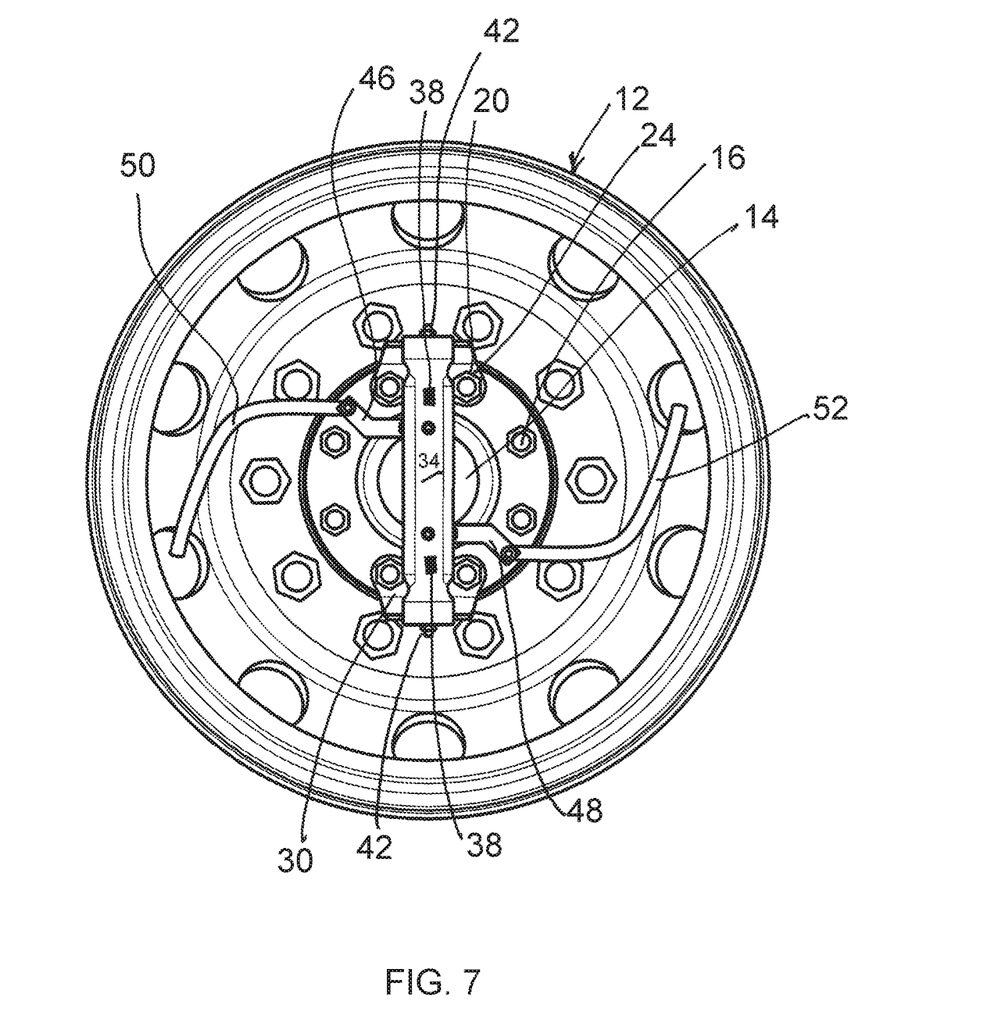
FIG. 7 is a front plan view of the preferred embodiment of the attachment device of FIGS. 4, 5 and 6 showing the air valve extensions mounted to the mounting arms.
Figure 8:
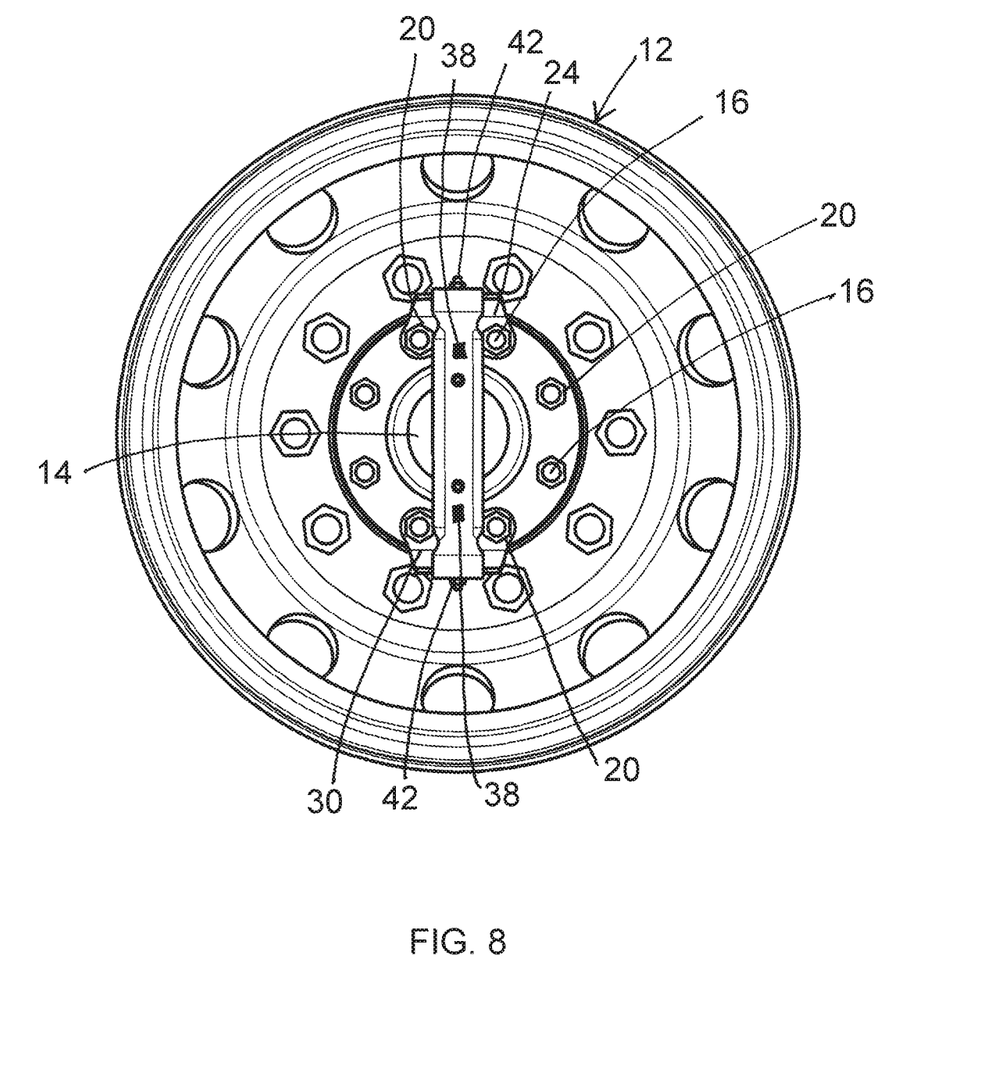
FIG. 8 is a front plan view of another preferred embodiment of the attachment device shown installed on the hub of a wheel.

A first and a second air valve extension 50, 52 may be positioned on connecting member 34 as shown in FIGS. 4, 5 and 7. In addition, first and a second air valve extension 50, 52 may be attached to first and second mounting arms 46, 48. First and second air valve extensions 50, 52 may be mounted to their respective mounting arms 46, 48 through respective threaded connections 54, 56. It may be appreciated by those skilled in the art that, while the connections are shown as threaded connections 54, 56, the connecting locations may be any type of connection that can hold, mount and adjust air valve extensions 50, 52 in the desired position for mounting with respect to cover 10. Aerodynamic wheel cover 10 may be attached to connecting member 34 for covering the opening of the wheel and allowing access to first air valve extension 50 or second air valve extension 52 through apertures 51, 53.

A method of mounting an aerodynamic cover 10 to wheel 12 of a vehicle is also illustrated in the preferred embodiments of FIGS. 1-8. As described above with references to FIGS. 1-8, the vehicle includes the hub surrounded by a plurality of parallel spaced studs 16. Each of the studs 16 having a longitudinal axis with a fixed distance between adjacent ones of the longitudinal axes. Wheel 12 includes an opening with a web having a plurality of spaced holes therein for receiving studs 16 and nuts 20 threaded on each of the studs to retain the hub to the axle of the vehicle. The method of mounting cover 10 to wheel 12 includes placing first retainer member 22 with planar portion 24 on two of the parallel spaced studs 16. Planar portion 24 has a surface 26 which is perpendicular to the longitudinal axis of studs 16 while in contact with the studs. Second retainer member 28, also having planar portion 30, is placed on two parallel spaced studs 16 positioned with respect to the studs on which first retainer member 22 is placed. As with first retainer member 22, planar portion 30 of second retainer member 28 includes surface 32 perpendicular to the longitudinal axis of studs 16 while in contact with the studs. It will be appreciated by those skilled in the art that depending on the configuration of first and second retainer members 22, 28, one or more studs will be contacted by each retainer member and their respective planar portions, 24, 30 when installed in place on the hub of wheel 12.

Connecting member 34 is placed across first and second retainer members 22, 28 and adjustment member, such as fasteners 42 and nuts 44, is provided to adjust the relative position of connecting member 34 with respect to first and second retainer members 22, 28. A spacer element, such as spacers 38, is positioned between the connecting member and the cover for spacing the cover from the wheel during installation. Spacer 38 serve to position cover 10 with respect to connecting member 34 during installation. Spacers 38 are typically removed after positioning of cover 10 and before fully securing cover 10 in position on connecting member 34. When in the installed position, first mounting arm 46 is mounted to and extends from connecting member 34. First air valve extension 50 is positioned on first mounting arm 46 and aerodynamic wheel cover 10 is fastened to connecting member 34 for covering the opening of wheel 12.

When mounted in its installed position, cover 10 provides access to first air valve extension 50 and second air valve extension 52 through apertures 51, 53. Connecting member 34 may be rigidly locked and unlocked to be installed and uninstalled from first and second retainer members 22, 28 through a combination of nuts and threaded bolts. Second mounting arm 48 may be mounted to connecting member 34 extending therefrom. Second air valve extension 52 may be positioned on second mounting arm 48 for filling a second tandem mounted tire on a truck or other heavy duty vehicle.

Embodiments of the wheel assemblies, cover assemblies and mounting assemblies and components such as those described herein may be manufactured from metal, metal alloys, polymers including Lexan® or similar durable material. In some embodiments, components may be manufactured using computer numeric control (CNC) techniques. Some embodiments disclosed herein may be formed with CNC techniques on a three axis machine. Such CNC forming may allow for increasing or decreasing the scale, size or features of a device, and which may advantageously reduce production costs.

In some embodiments, common hardware or machined elements may be utilized and such may be constructed from a variety of materials, which may reduce overall complexity, reduce manufacturing costs, or other advantages. It will be appreciated by those skilled in the art that hardware including fasteners, connecting elements and the like may be common off-the-shelf parts of standard size. In addition, while specific component values and sizes have been shown for ease of illustration and description, it should be understood that a variety of sizes, combinations and types are possible and contemplated by the embodiments of the invention. Further, while specific connections have been used and shown for ease of description, it should also be understood that a variety of connection points are possible and may vary depending on the specifics of the application and construction used.

Reference throughout this specification to "one embodiment," "an embodiment," "preferred embodiment," or similar language means that a particular feature, structure, or characteristic described in connection with the embodiment is included in at least one embodiment of the present invention. Thus, appearances of the phrases "in one embodiment," "in an embodiment," "in a preferred embodiment," and similar language throughout this specification may, but do not necessarily, all refer to the same embodiment.

The embodiments of the present invention herein described and disclosed are presented merely as examples of the invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. Other embodiments, forms and structures coming within the scope of this invention will readily suggest themselves to those skilled in the art, and shall be deemed to come within the spirit and scope of the invention.

The invention claimed is:

1. A cover for covering a wheel of a vehicle, the vehicle having a hub surrounded by a plurality of parallel spaced studs, each of the studs having a longitudinal axis and there being a fixed distance between adjacent ones of the longitudinal axes, the wheel having a web with a plurality of holes therein for receiving the studs and a nut threaded on each of the studs to retain the wheel to the hub, the cover comprising:
   a first retainer member having a planar portion for contacting one of the parallel spaced studs, the planar portion having a surface perpendicular to the longitudinal axis of the stud while in contact with the parallel spaced studs;
   a second retainer member having a planar portion for contacting one of the parallel spaced studs, the planar portion having a surface perpendicular to the longitudinal axis of the stud while in contact with the parallel spaced studs;
   a connecting member spanning the first and second retainer members, the connecting member including a first air valve extension and a second air valve extension both positioned on the connecting member;
   a first mounting arm and a second mounting arm both extending from the connecting member; and
   an adjustment member for adjusting the relative position of the connecting member with respect to the first and second retainer members.

2. The cover of claim 1 including a member for rigidly locking and unlocking the connecting member to the first and second retainer members.

3. The cover of claim 2 wherein the locking member is a threaded fastener and a nut.

4. The cover of claim 1 wherein the first air valve extension is attached to the first mounting arm.

5. The cover of claim 1 wherein the second air valve extension is attached to the second mounting arm.

6. The cover of claim 4 wherein the first air valve extension is attached to the first mounting arm through a threaded connection.

7. The cover of claim 5 wherein the second air valve extension is attached to the second mounting arm through a threaded connection.

* * * * *